US012097679B2

(12) United States Patent
Luginbühl et al.

(10) Patent No.: US 12,097,679 B2
(45) Date of Patent: Sep. 24, 2024

(54) PRESS DEVICE FOR A POWDER PRESS AND A TOOL CHANGING SYSTEM

(71) Applicant: OSTERWALDER AG, Lyss (CH)

(72) Inventors: Eric Luginbühl, Lüscherz (CH); Basil Kambli, Bern (CH); Mischa Kindler, Utzenstorf (CH); Michael Sollberger, Lyss (CH); Peter Kunz, Aegerten (CH); Alex Wehrli, Kehrsatz (CH)

(73) Assignee: OSTERWALDER AG, Lyss (CH)

( * ) Notice: Subject to any disclaimer, the term of this patent is extended or adjusted under 35 U.S.C. 154(b) by 1004 days.

(21) Appl. No.: 16/968,386

(22) PCT Filed: Feb. 25, 2019

(86) PCT No.: PCT/EP2019/054612
§ 371 (c)(1),
(2) Date: Aug. 7, 2020

(87) PCT Pub. No.: WO2019/162510
PCT Pub. Date: Aug. 29, 2019

(65) Prior Publication Data
US 2020/0391466 A1 Dec. 17, 2020

(30) Foreign Application Priority Data
Feb. 26, 2018 (EP) .................................... 18158649

(51) Int. Cl.
*B30B 7/02* (2006.01)
*B30B 11/04* (2006.01)
*B30B 15/02* (2006.01)

(52) U.S. Cl.
CPC .............. *B30B 7/026* (2013.01); *B30B 11/04* (2013.01); *B30B 15/028* (2013.01)

(58) Field of Classification Search
CPC ........ B30B 7/026; B30B 11/04; B30B 15/028
See application file for complete search history.

(56) References Cited

U.S. PATENT DOCUMENTS 4,482,307 A 11/1984 Schaidl et al.
2017/0015077 A1* 1/2017 Kobayashi .............. B28B 3/021
2017/0087638 A1 3/2017 Schmitt et al.

FOREIGN PATENT DOCUMENTS

CN 107116828 A * 9/2017 ........... B30B 15/028
DE 3142126 A1 5/1983
(Continued)

OTHER PUBLICATIONS

JPH06155094A Machine translation accessed on ESpacenet Jul. 3, 2023 (Year: 1994).*
(Continued)

*Primary Examiner* — Alison L Hindenlang
*Assistant Examiner* — Erica Hartsell Funk
(74) *Attorney, Agent, or Firm* — Tucker Ellis LLP

(57) ABSTRACT

The invention relates to a press device (100) for a powder press (1) for producing pellets from a compressible material, wherein the powder press (1) comprises a press frame (2) that has an upper and a lower frame portion, an upper and/or lower punch arrangement (3) which each comprise a tool, and a die arrangement (4), which define a mold cavity into which the compressible material is introducible, and a drive unit (5) that is operatively connected to the punch arrangement (3) and/or the die arrangement (4), wherein, in order to form the pellet, the upper and/or lower punch arrangement (3) and the die arrangement (4) are movable relative to one another along a pressing axis (6) by means of the drive unit (5) and are able to be pressed against one another. The press device (100) has multiple tool planes (10) that are arranged above one another, which each comprise a carrying element (12) and a push-in element (50) that is able to be received on the carrying element (12) and arrested, on which at least one of the tools is receivable.

14 Claims, 6 Drawing Sheets

(56) References Cited

FOREIGN PATENT DOCUMENTS

| | | | | |
|---|---|---|---|---|
| DE | 602004006527 | T2 | 1/2008 | |
| EP | 0436792 | A2 | 7/1991 | |
| EP | 1658963 | A2 * | 5/2006 | ............ B30B 11/02 |
| EP | 1764173 | A2 | 3/2007 | |
| JP | H06155094 | A | 6/1994 | |
| JP | 2000225493 | A | 8/2000 | |
| JP | 2002172495 | A | 6/2002 | |

OTHER PUBLICATIONS

Dong (CN107116828A) translation accessed on ESpaceNet Dec. 19, 2023 (Year: 2017).*

International Search Report issued in PCT/EP2019/054612 dated Jun. 18, 2019, 7 pages.

Written Opinion issued in PCT/EP2019/054612 dated Jun. 18, 2019, 5 pages.

* cited by examiner

FIG. 4a
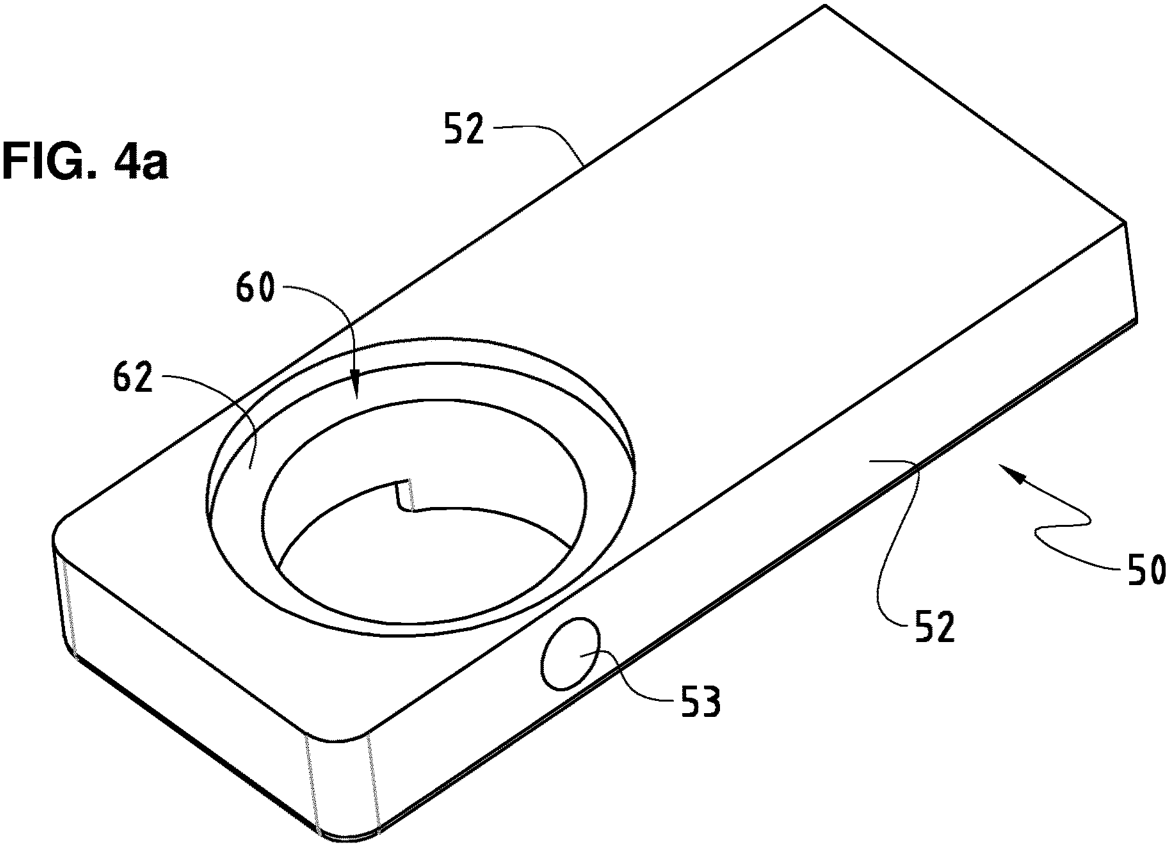
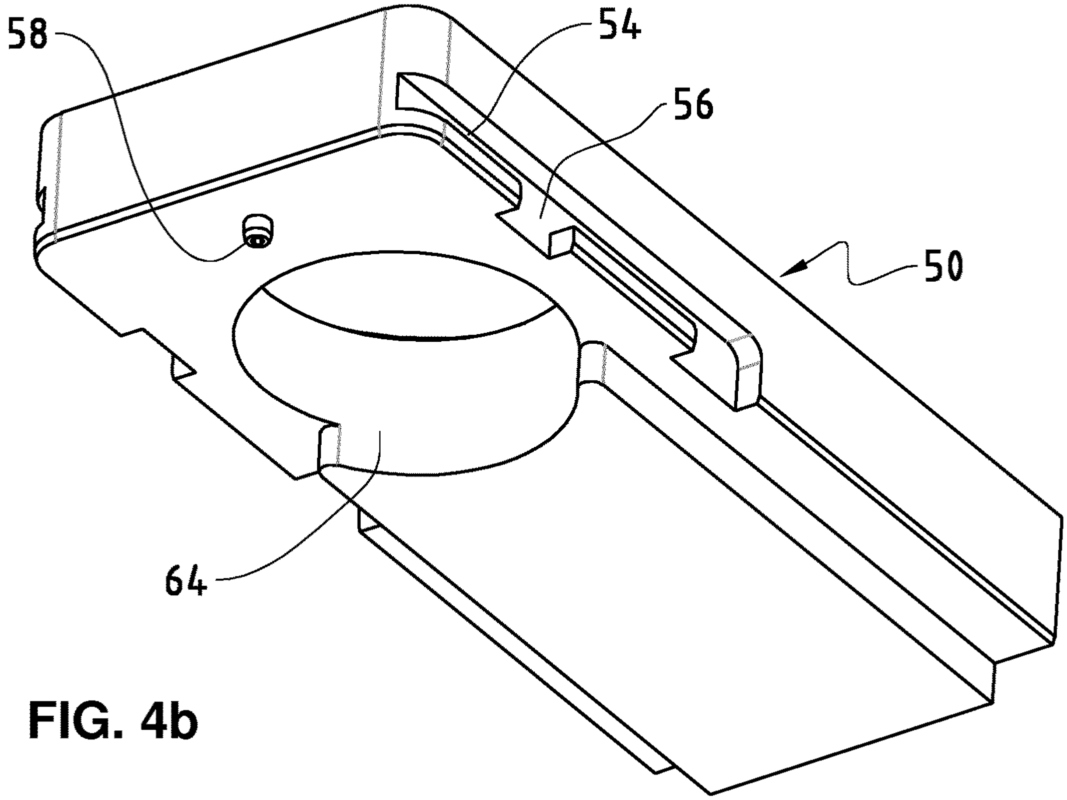
FIG. 4b

PRESS DEVICE FOR A POWDER PRESS AND A TOOL CHANGING SYSTEM

TECHNICAL FIELD OF THE INVENTION

The invention relates to a press device for a powder press for producing a pellet from a compressible material, and to a corresponding tool changing system.

PRIOR ART

Powder presses for producing dimensionally stable pellets or moldings from a compressible material conventionally comprise a frame, an upper and a lower punch arrangement and a die arrangement, which form a mold cavity into which the compressible or respectively powdery or free-flowing material is introducible, and a drive unit that is operatively connected to the punch arrangements and/or the die arrangement, wherein, in order to form the pellet, the punch arrangements and the die arrangement are movable relative to one another along a pressing axis by means of the drive unit and are able to be pressed against one another.

Tools are available to manufacture differently shaped and dimensioned pellets, wherein an own, independently movable tool plane is virtually required for each component height. In general, tool planes are arranged above one another in presses, wherein each of the tool planes comprises tool-specific assemblies, for example a punch carrier, a punch, a supporting device and guide systems. In general, a complemented tool plane is also referred to as an additional axis.

In order to produce a type of pellet, individual tools are required which have to accordingly be replaced during a change of the type of product to be manufactured. The approach taken by newer developments is that fabrication occurs in smaller product series such that it is necessary to convert the press at shorter intervals. In order to avoid long stoppage times of the press device, an efficient conversion is becoming more and more important. The converting additionally proves to be physically demanding for the operating personnel, in particular if heavy tools have to be replaced overhead.

For a tool change for converting a powder press, it is known from the prior art that individual tools have to be dismantled from the press and replaced by another. Admittedly, only a restricted operating area is available for this. Long conversion times and long adjusting times, during which the powder press cannot be deployed, have to additionally be considered.

So-called adapter changing systems are also known. A modular press is thus described in DE 31 42 126, which consists of the actual press for applying the main pressing force and a press device which can be inserted into the press in an adapter-like manner. The adapter-like press device comprises a frame structure having pull rods which exist to guide a plurality of plates, punch carriers and, in particular, a die plate between connecting devices likewise arranged or respectively mounted in the frame structure, which establish a connection with the press-bears of the press. In the case of this arrangement, a baseplate is provided, in which hydraulic devices for relatively moving individual plates configured as punch carriers are arranged. The baseplate is mounted by means of a bearing attachment in the actual press. The further plates are movably mounted with respect to the baseplate in the frame structure, wherein a die holding plate is rigidly connected via the frame structure to the lower connecting device of the adapter-like press device and is displaceably arranged with respect to the upper connecting device in the frame structure. Further plates or respectively punch carriers are movably mounted with respect to the baseplate in the frame structure such that they can be moved between a filling position and a pressing end position. The punches are arranged on the respective punch carriers, wherein, in the pressing end position, the individual punch carrier is supported on supporting devices or respectively fixed stops. The stoppage times are reduced with a replacement of the adapter-like press device which is assembled and prepared outside of the press and can be moved between a converting position and a pressing position. Such an adapter changing system is admittedly expensive and leads to high investment costs.

For a tool change, whether of individual tools or in the case of adapter-like tool changing systems, a careful adjustment of the individual punch carriers relative to one another and relative to the frame structure is constantly required, in order to avoid tilting or non-uniform pressing. The disadvantage of an adapter changing system is that, following the insertion of the adapter, the control and supply lines of the press required for the functions have to be connected or respectively coupled to the inserted tools and to allocated adjustment drives.

SUMMARY OF THE INVENTION

The object of the present invention is therefore to improve a press device for a powder press for producing pellets from a compressible material in such a way that the process of installing various tools is simplified and shortened, wherein investment costs are reduced. A tool change should additionally be easier to handle and less exhausting for the operating personnel.

A powder press for producing pellets from a compressible material comprises a press frame that has an upper and a lower frame portion, an upper and/or lower punch arrangement which each comprise a tool and a die arrangement, which define a mold cavity into which the compressible material is introducible, and a drive unit that is operatively connected to the punch arrangement and/or the die arrangement. In order to form the pellet, the upper and/or lower punch arrangement and the die arrangement are movable relative to one another along a pressing axis by means of the drive unit and are able to be pressed against one another.

A press device according to the invention for a powder press, which is known per se, has multiple tool planes that are arranged above another. The tool planes are also referred to as additional axes and comprise inter alia at least one punch and components carrying this. The term punch is a generic term and refers to both an upper and/or lower punch which is/are required in order to produce a dimensionally stable pellet. Accordingly, each additional axis comprises, for example a plate, a punch carrier or punch holder, a punch or respectively cylinder, a supporting device for a fixed stop and/or a guide system.

On a respective tool plane the components are arranged on a plate-shaped plane which, according to the invention, is not configured integrally, but rather is configured in multiple parts. The tool plane accordingly comprises a carrying element which is firmly arranged in the powder press and also, in the event of a tool change, is not extracted therefrom. Accordingly, connections and couplings to the supply lines of the powder press are retained and an elaborate adjustment of individual planes is not required. In particular, actuators for a comprised actuator system and/or sensors for sensor technology of the respective tool planes remain in the powder press, i.e. these are allocated to the carrying elements remaining in the powder press. In order to complement the plate-shaped plane of the tool plane, a push-in element is provided, which can be received on the carrying element and is held and mounted thereon.

A receptacle is preferably configured on the carrying element positioned in the powder press, which has a push-in opening on one side. The push-in element configured complementarily to the receptacle can be pushed into the carrying element via the push-in opening. In an embodiment, the receptacle is configured in a U-shape, i.e. each tool plane arranged in the powder press forms a U-shaped horizontal frame in which the correspondingly configured push-in element can be received in each case. The push-in openings of carrying elements arranged above one another are oriented in the same direction and are easily accessible for the operating personnel. In this case, a kind of drawer principle is realized, in which one carrying element remains in the powder press and one push-in element can be pushed in like a drawer via an opening. It is advantageous if a plurality of the push-in elements forming the upper tool planes and a plurality of the push-in elements forming the lower tool planes, each combined into sets, are pushed in or respectively pushed out together.

The push-in elements which can be pushed into the carrying elements of the tool planes comprise those components which complement a tool plane of one of the punch arrangements. These components can be constructed or respectively arranged on the push-in elements outside of the press.

Complementarily configured guide elements are provided, for example configured as a groove engaging over one another, along the push-in path for better guidance on the carrying element and on the push-in element.

The push-in element is pushed along the push-in path into a defined position into the carrying element. An arresting device can be provided in order to arrest joined-together push-in elements and carrying elements in the defined position. In an exemplary embodiment, an arresting bolt is provided on an underside of the push-in element, which, received in the defined position of the push-in element on the carrying element of the tool plane, engages in an opening provided on the carrying element. Accordingly, the position of the push-in element is fixed relative to the carrying element, in particular in the direction of the pressing axis.

In order to achieve a positioning of the pushed-in push-in element in the carrying element of the respective tool plane vertically to the pressing axis, locking devices are likewise provided. In an embodiment, a locking device is movably received between the push-in element and carrying element in a region of the push-in path. This locking device can then be activated by an actuator, i.e. moved from a first position into a locking position if the push-in element is received in the defined position on the carrying element. The locking device can preferably be activated by means of a pneumatic or electrical actuator, wherein locking devices can in particular be provided on both sides of the push-in path. This proves to be particularly advantageous compared with hydraulic actuators since, in the surroundings of powder presses, hydraulics, in particular oil hydraulics, should be avoided if at all possible, in order to avoid leakage problems.

According to the invention, corresponding tool-specific components can be arranged on the push-in element. Thus, a punch can be arranged on a punch carrier on the push-in element, while a supporting device for a fixed stop and, in particular, hydraulic actuators and comprised measuring systems are also provided on the remaining part of the tool plane, i.e. the carrying element, in the powder press.

According to the invention, the carrying element and pushed in push-in element form an additional axis or respectively a tool plane. The high forces acting on the individual additional axes during a pressing operation have to be received in such a way that no tilting or shifting of the tool planes arranged largely horizontally in the powder press occurs. Accordingly, it is provided according to the invention that the respective tool plane has a form which compensates for the differences in the stiffness occurring due to the division of the tool plane into the carrying element and push-in element. For example, the thus multi-part, plate-like tool plane can be configured asymmetrically such that under the loading of the pressing operation a horizontal parallel displacement of the complete tool plane takes place and no pitching can be noted. To this end, strength and deformation investigations of the additional axes can be evaluated with a finite-element method, which are the basis for determining the shaping of a tool plane configured according to the invention or respectively of the plate-shaped plane.

In order to improve the operability of a tool change, it is provided according to the invention that the necessary tools for a new product series can be prepared outside of the powder press on the push-in elements and can be easily transported to the location of the replacement. This procedure is also known for a tool change with a prepared tool adapter which is arranged as a press device in a powder press. In contrast to the known adapter-like tool changing systems, a modular system is provided according to the application, which allows significantly simplified handling during the tool change. According to the invention, an apparatus or respectively a tool carrier is provided, in which the push-in elements including the required tool components can be received. In particular, it can be provided in an embodiment that the multiple push-in elements which form the upper or respectively lower tool planes can be combined as a respective set. Such a set forms a unit, wherein the individual push-in elements are braced against one another such that no relative movement occurs. At a set-up station, also referred to as a setting-up station, the push-in elements can be equipped with the required arrangements of the punch carrier and punch and can be arranged in the tool carrier.

The tool carrier is configured in such a way that the push-in elements which can be extracted from the tool planes or respectively can be pushed into these can be received in a holding device and are held by means of a tensioning device in the latter. The holding device can be provided by a mobile device as described below. In particular, the tool carrier can be docked on the powder press which is at a standstill at one side, from which the push-in openings of the carrying elements are accessible. The tool carrier can, for example, be brought into a horizontal and/or vertical position by means of a lifting apparatus, e.g. a stacker truck or a crane device, in which position the tool change can be carried out.

The mobile device is integrated on the tool carrier in such a way that, in the docked position of the tool carrier, it can be displaced in the direction of the push-in openings. In order to remove individual or multiple push-in elements from the corresponding tool planes, arranged in parallel horizontal planes, the respective locking and arresting devices, which fix the push-in elements in the defined position in the tool plane or respectively additional axis, are loosened. The push-in elements released in such a way are transferred to the tool carrier and are firmly connected to the latter by means of the tensioning device. For stabilization purposes, spacers can be arranged between the planes of the push-in elements, which can be received in position on the tool carrier. The mobile device of the tool carrier moves back into a starting position such that the push-in elements are withdrawn from the carrying elements of the tool planes and from the push-in openings and removed. The tool carrier and the removed push-in elements accordingly form a unit which can hereafter be moved as a whole.

In an embodiment, the tool carrier equipped to such an extent can be brought to a turning station. The turning station is designed to transfer the push-in elements arranged on the tool carrier to a transport unit. In an embodiment, the transport unit comprises clamping plates arranged parallel to one another, which span a space between them. The push-in elements can be received in the space, these are preferably mounted on horizontal supports which are each arranged vertically displaceably on the clamping plates. The equipped transport unit can be transported further to a setting-up station. The turning station is additionally designed to rotate the equipped transport unit by 180°. This proves to be advantageous for the tool change of an upper punch arrangement. By rotating the transport unit by 180°, it is made possible for the operating personnel to construct the required components of a tool plane or respectively of an additional axis so that they are very easily accessible from above.

It is alternatively provided that the tool carrier transfers the received push-in elements directly to the turning station which is designed to transport the received push-in elements and to rotate them by 180° such that no transport unit is required for this.

BRIEF DESCRIPTION OF THE DRAWINGS

The invention is explained in greater detail below with reference to the exemplary embodiments depicted in the figures, wherein:

FIGS. 4*a* and 4*b* show a schematic depiction of a push-in element which can be received on a carrying element according to FIG. 2;

DETAILED DESCRIPTION OF THE EMBODIMENTS OF THE INVENTION

Figure 1:
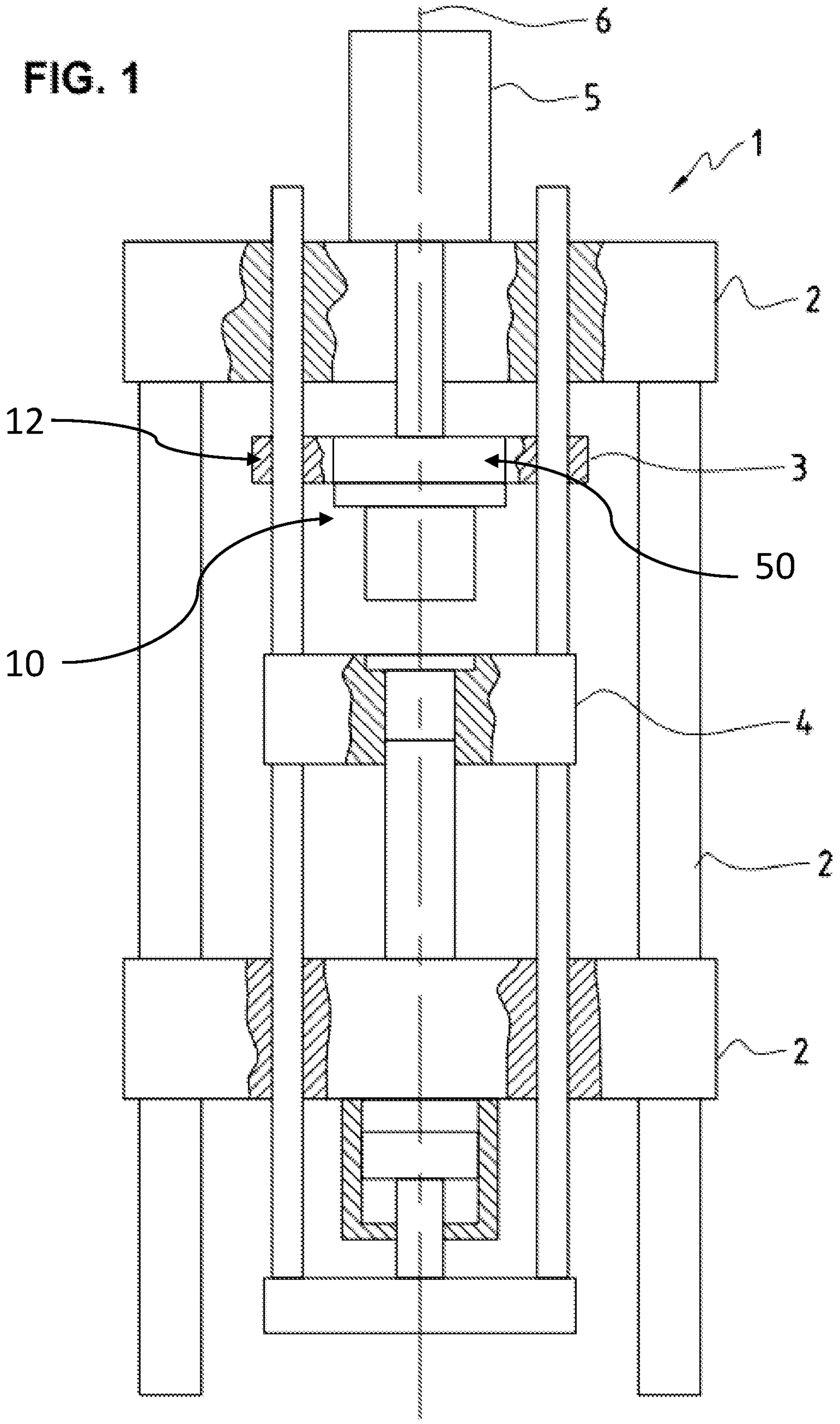
FIG. 1 shows a schematic depiction of a powder press.

FIG. 1 shows a powder press 1 for producing dimensionally stable pellets from compressible material, in particular in powder form or in granular form, comprising a multiplicity of modules which are known per se. The powder press 1, which is known per se, substantially has a press frame 2 having an upper and a lower frame portion/traverse which are held at a distance from one another by means of columns and are firmly connected to one another and braced in such a way that the flux of force through these up to punch arrangements 3 or respectively the punches, also referred to as the tool, can be built up. The columns can be embodied as sliding devices, on which a die arrangement 4 can slide along and is accordingly height adjustable within a press unit. In order to adjust the die arrangement 4, a corresponding adjustment device can be provided which tailors a height adjustment to the relative movement of the punches.

In order to build up a pressing force, a drive unit 5 is, for example, arranged on the upper side of the press frame 2. By means of an operative connection, the drive unit 5 is operatively connected to the upper punch arrangement 3, i.e. the upper press tool, such that the latter is moved in the direction of the die arrangement 4 or respectively along a pressing axis 6. Due to the acting pressing force, individual components of the pressing tools are moved relative to one another and spanned against the frame portion on the underside, such that the punches compress the powder into a pellet.

It is known from the prior art that the press tool is assembled from components of a modular system, wherein a simple adaptation to the pressing to be pressed in each case is made possible. A tool on the upper side of the upper punch arrangement 3 and a tool on the underside of a lower punch arrangement 3 can have a comparable construction. A tool can have a base body, at which a connecting device makes possible a detachable but fixed coupling to the corresponding frame portion 2. An adapter, which can be prepared and designed as a tool carrier outside a powder press 1 for corresponding purposes before it is inserted with few working steps into a press, is also known. In general, the punches are each attached to punch carriers, wherein the punch carriers have attachment or fastening surfaces which are configured circularly for example. Centrally, the attachment surfaces each have a through-opening, in order to be able to guide through punches or fastening elements leading to punches of further inlying punches. The punches are preferably arranged rotationally symmetrically around a pressing axis 6, along which an adjustment direction or respectively pressing direction of the punches runs.

Figure 2:
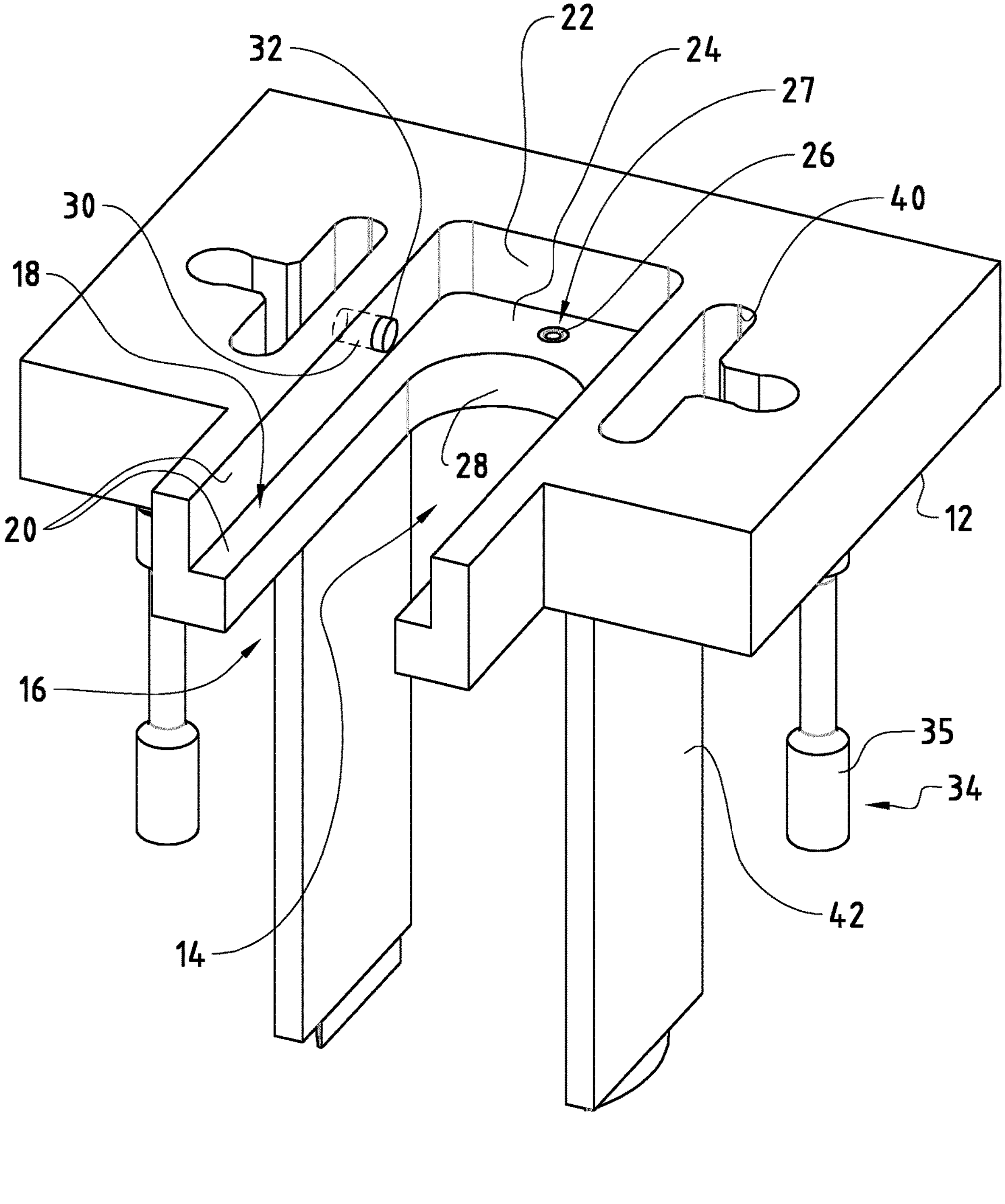
FIG. 2 shows a schematic depiction of an additional axis, comprising a carrying element.

According to the invention, a press device 100 comprises tool planes 10 which are each formed from arrestable elements fitted into one another. Thus, a schematic depiction of a carrying element 12 which is an element of a tool plane 10 which is firmly received in the powder press 1 is depicted in FIG. 2. The carrying element 12 is configured as a horizontal plane in the exemplary embodiment shown, and has a receptacle 14, configured as a lying U-shaped receptacle having a push-in opening 16 which is open on one side, in the arrangement or extension plane, i.e. in a plane vertically to the pressing axis 6. Guide surfaces 20 which guide the pushing in of a complementarily configured push-in element 50 (not depicted in FIG. 2) are configured along the side surfaces 18 delimiting the receptacle 14. In the depicted exemplary embodiment, the guide surfaces 20 are configured in such a way that a vertical and a horizontal guide surface 20 are formed. On an end region 22 of the receptacle 14 opposite the push-in opening 16, a supporting surface 24 is provided, on which the pushed in push-in element (not depicted) can rest. A receptacle 26 in which a mating part can engage and thus forms an arresting apparatus 27 is provided on said supporting surface 24. The horizontal guide surfaces 20 and the supporting surface 24 form a second horizontal plane with a recess 28 which is located within the receptacle 14 of the allocated carrying element 12. In particular, the recess 28 is configured in an arc shape in an end region.

Openings 30 are additionally configured on the vertical side surfaces 20 of the receptacle 14 in which a fastening element 32 is displaceably received in each case. Depicted in FIG. 2 are pins 32 which are displaceably received in bores as elements of an activatable locking device. Alternatively, the fastening element 32 can comprise latching noses which can engage in corresponding latching receptacles configured on the push-in element 50, as depicted in FIG. 4*b*. It is provided that the fastening element 32 can be moved by means of an actuator 34 into an arresting or respectively latching position. In an embodiment, the actuator 34 is a pneumatic actuator, the connections of which are designated in FIG. 2 with 35.

The horizontally oriented carrying element 12 additionally has through-guides 40 in which supporting devices 42 for fixed stops are, for example, displaceably received.

Figure 3:
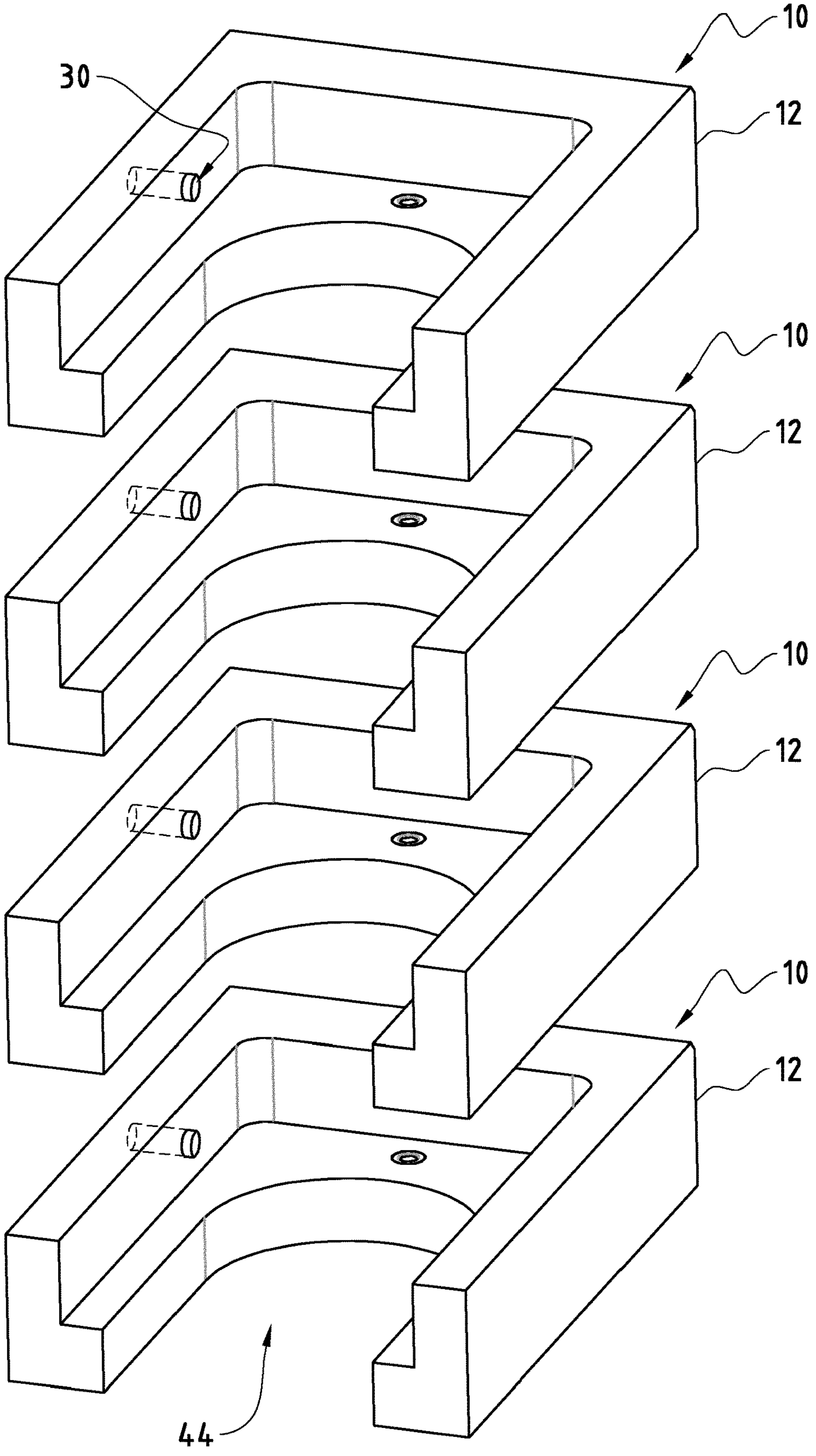
FIG. 3 shows a schematic depiction of multiple carrying elements of the additional axes lying above one another.

In FIG. 3, multiple tool planes 10 arranged above one another are depicted or respectively carrying elements 12 lying above one another in parallel are shown. In order to make possible as compact a design of multiple tool planes as possible, the carrying elements 12 are differently dimensioned. Accordingly, they do not only differ from one another in terms of their size, but they can also have guide elements which are arranged offset from one another for receiving in the powder press 1. The receptacles 14 of carrying elements 12 lying above one another form an interior space 44, wherein tools or respectively punches of further inlying punches can be guided through.

In FIG. 4*a*, a perspective top view of a push-in element 50 is shown. The push-in element 50 is configured as a largely rectangular plate, wherein there is provided in each case on parallel side surfaces 52 in one region a bore 53, in which the fastening elements 32 configured as displaceable pins engage, which fastening elements are provided on the respective carrying element 12.

FIG. 4*b* shows a perspective lower view of a push-in element 50 in another embodiment. In this view, an arresting bolt 58 is visible, which can engage in the receptacle 26 of the arresting apparatus 27 configured on the supporting surface 24 on the carrying element 12 and thus provides a horizontal arresting of the push-in element 50 and carrying element 12. Alternatively, to the catching of the push-in element 50 and carrying element 12, a groove 54 is additionally configured, in which latching projections 56 are arranged. Correspondingly configured mating parts of the carrying elements 12, e.g. fastening elements 32 configured as latching noses, activated by the actuator 34, can engage between the latching projections 56 for example, if the push-in element 50 is received in position on the corresponding carrying element 12.

The push-in element 50 depicted in FIGS. 4*a* and 4*b* serves as a mounting device for punches to be arranged thereon or respectively a tool. To this end, a punch carrier or respectively punch holder 60 is provided, which can be configured in multiple forms, in particular in a circular, oval, square, polygonal form or respectively web form or free form. The punch holder 60 comprises a support surface 62 for a punch which can, for example, have a cylindrical form. The punch holder 60 has a lower axial end face surface 64 which is configured in the form of a single-thread screw face and which comes to rest on an axial end face surface of an adjustment ring. Accordingly, the punch holder and the adjustment ring can rest on one another along a kind of single-thread screw face such that when the adjustment ring is turned, a height adjustment of the corresponding punch is attained.

Figure 5:
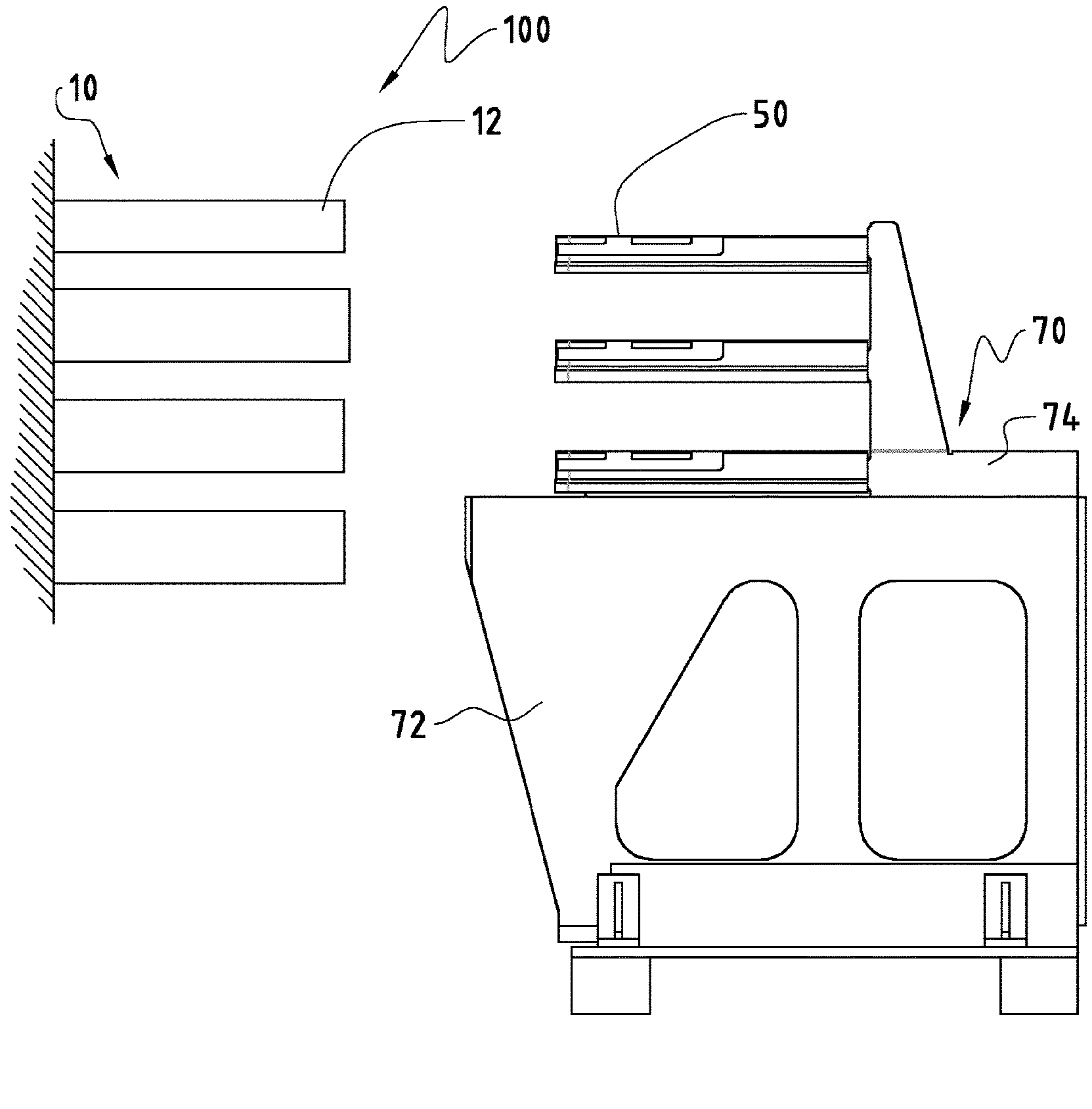
FIG. 5 shows a schematic depiction of a tool carrier, in which push-in elements are arranged.

In FIG. 5, an arrangement is schematically depicted which, on the one hand, schematically shows a press tool, designated as a press device 100, and, on the other hand, a tool carrier 70. According to the invention it is provided that the tool planes 10 of a press device 100 each have a carrying element 12 and a push-in element 50 equipped with the tool which can be received therein. During a tool change the carrying element 12 including the existing connections remains in the powder press 1, while push-in elements 50 are extracted and replaced by new ones.

It is clear from FIG. 5 that the push-in elements 50 are received, lying above one another; on the tool carrier 70, and are held in the latter, wherein this arrangement also illustrates the drawer principle pursued with the invention. The tool carrier 70 comprises a frame 72, in which a mobile device 74 is received, which can be moved in such a way that the push-in elements 50 can be transferred to the carrying elements 12 of the press device 100. The tool carrier 70 can, for its part, be moved as a unit such that it can be transported into the proximity of the powder press 1 or to a setting-up station and/or turning station. Since the push-in elements 50 are held in the tool carrier 70 on only one side, spacers can be arranged between individual push-in elements 50 in order to stabilize this arrangement.

Figure 6A:
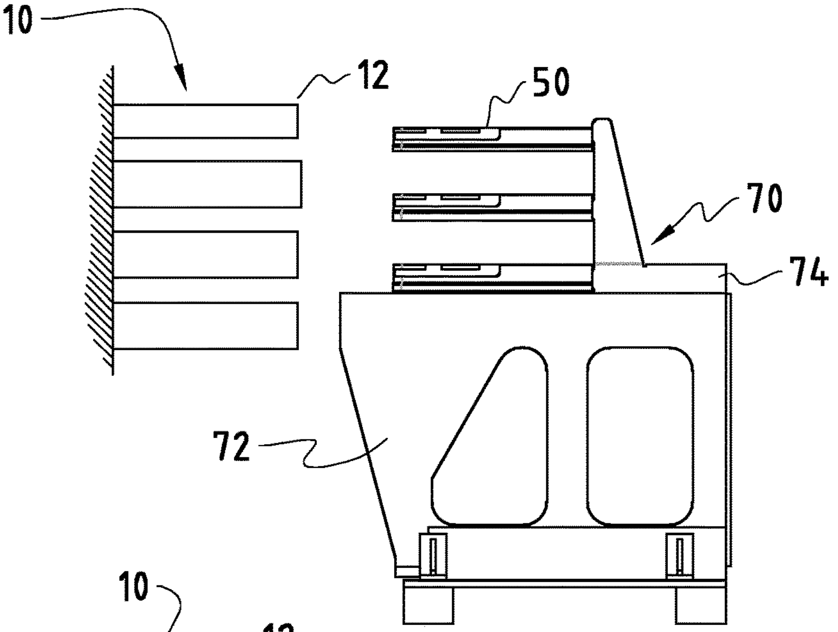
FIGS. 6*a* to 6*c* show a schematic depiction of different phases of a transfer of push-in elements to carrying elements.
Figure 6B:
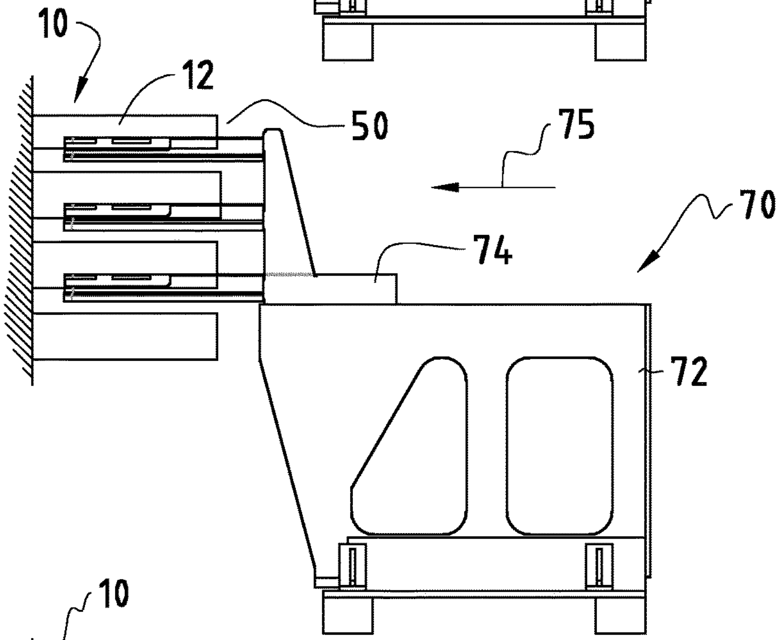
Figure 6C:
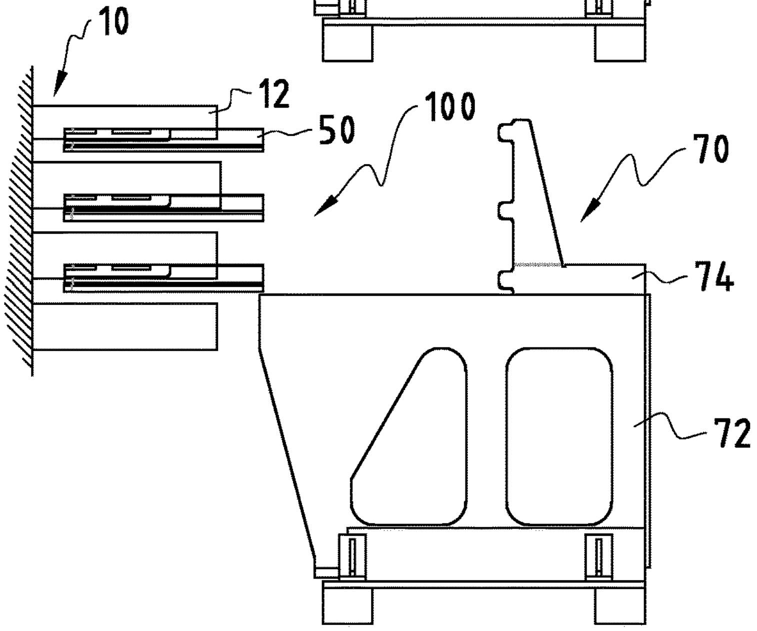

FIGS. 6*a* to 6*c* show individual phases of a transfer of prepared push-in elements 50 to carrying elements 12 arranged in the powder press 1 in order to complement the press device 100. On the movable tool carrier 70, the push-in elements 50, which are equipped with those elements which complete an additional axis, are received in a holding manner on the mobile device 74. The preparation of the push-in elements 50, i.e. the equipping with the corresponding tool, and of the tool carrier 70, can take place in a so-called set-up region. In particular, a push-in set can be prepared in the set-up region, for example in the form of equipped push-in elements 50 received between clamping plates, which is designated in its entirety as a transport unit. The push-in set can, depending on the installation position in a turning station, be brought into a position in which the push-in elements are installed in the powder press 1, i.e. either in the region of the upper or lower additional axes. It is advantageous that the tools can constantly be arranged from above on the push-in elements 50, which is easier to handle for the operating personnel. The push-in elements 50 prepared in such a way are held between clamping plates and if the push-in set prepared in such a way is provided for an additional axis which is provided at the top in the powder press 1, it is rotated by 180° in the turning station, in order to be transferred in this position to the tool carrier 70.

The tool carrier 70 having the push-in elements 50 received thereon is brought into the installation position with respect to the powder press 1, wherein this can be effected for example by a stacker truck. As depicted in FIG. 6*b*, the push-in elements 50 are pushed in along a travel path, indicated with the arrow 75, by means of the mobile device 74 into the carrying elements 12 of the tool planes 10 arranged in the powder press 1 and, in an end position, the locking devices and arresting mechanisms are activated in such a way by means of the actuators 34 that the push-in elements 50 are each arrested in the carrying elements 12 in the direction of the pressing axis 6 and vertically thereto.

It is depicted in FIG. 6*c* that, following the transfer of the push-in elements 50 into the carrying elements 12, the mobile device 74, is retracted from the powder press and the tool carrier 70 is available, empty, for further use.

The invention claimed is:

1. A press device for a powder press for producing pellets from a compressible material, wherein the powder press comprises:

a press frame that has an upper and a lower frame portion, an upper and/or lower punch arrangement which each comprise a tool, and a die arrangement, which define a mold cavity into which the compressible material is introducible, and a drive unit that is operatively connected to the punch arrangement(s) and/or the die arrangement, wherein, in order to form a pellet, the upper and/or lower punch arrangement and the die arrangement are movable relative to one another along a pressing axis by means of the drive unit and are able to be pressed against one another, wherein the press device has multiple tool planes that are arranged above one another, each said tool plane comprising a carrying element which is arranged fixedly in the powder press, and a push-in element adapted to be received on the carrying element and arrested, on which at least one of the tools is receivable and which via a push-in opening is able to be pushed in a horizontal direction into the carrying element.

2. The press device according to claim 1, wherein each said carrying element has a U-shaped receptacle having the push-in opening into which the complementarily configured push-in element can be pushed along a push-in path into a defined position.

3. The press device according to claim 1, wherein each said push-in element can be arrested on the associated carrying element in a direction of the pressing axis of the punch arrangement and vertically to the pressing axis.

4. The press device according to claim 1, wherein each said push-in element can be arrested on the associated carrying element vertically to the pressing axis by means of a locking device which can be activated by an actuator.

5. The press device according to claim 4, wherein the actuator is a pneumatic or electric actuator.

6. The press device according to claim 1, wherein a unit made up of a said carrying element and its associated push-in element is configured in such a way that a constant stiffness with respect to a force effect exists along the pressing axis.

7. The press device according to claim 1, wherein a plurality of said push-in elements are combined into a set which forms in each case upper and lower tool planes, wherein the push-in elements are arranged braced against one another in the respective set.

8. A tool changing system, comprising the press device according to claim 1, wherein the tool carrier can be positioned with respect to the tool planes such that the push-in elements of the respective tool planes can be extracted by means of a mobile unit on the tool carrier and can be received on the tool carrier or respectively can be extracted from the tool carrier and can be pushed into the tool planes.

9. The tool changing system according to claim 8, wherein the push-in elements received in the tool carrier are held by a tensioning apparatus and spacers are arranged between neighboring push-in elements lying parallel to one another.

10. The tool changing system according to claim 8, wherein the tool carrier can be coupled to a turning station.

11. The tool changing system according to claim 10, wherein the turning station is adapted to transfer the push-in elements received in the tool carrier to a transport unit.

12. The tool changing system according to claim 11, wherein the turning station is adapted to rotate the transport unit equipped with the push-in elements by 180°.

13. The tool changing system according to claim 8, wherein the tool carrier is adapted to transfer the push-in elements received in the tool carrier to a turning station.

14. The tool changing system according to claim 13, wherein the turning station is adapted to transport and rotate received push-in elements by 180°.

* * * * *